T. TUFTS.
Tree-Protector.
No. 54,232.
Patented Apr. 24, 1866.
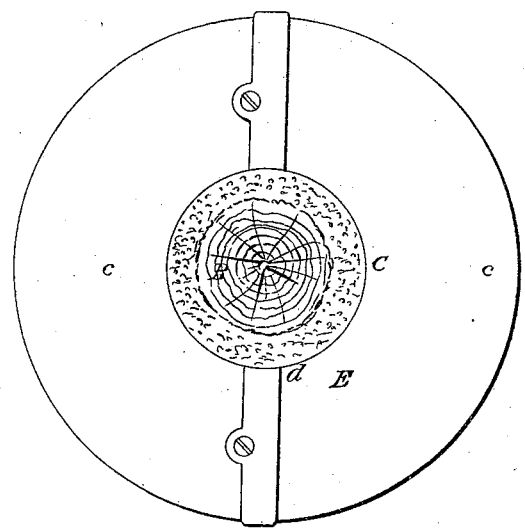
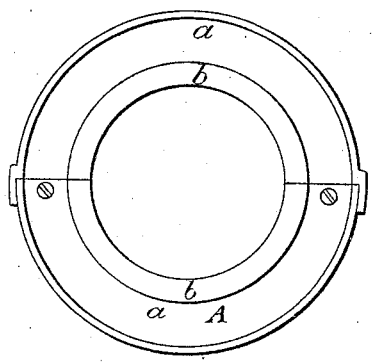
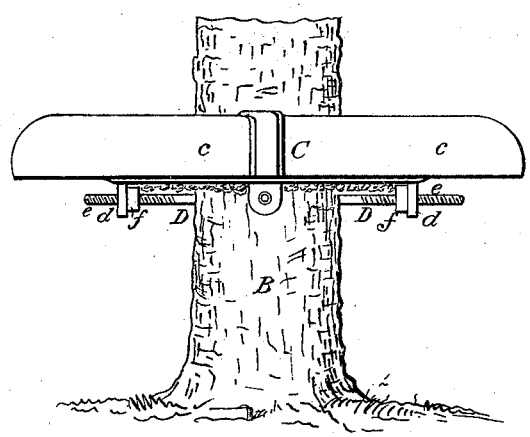
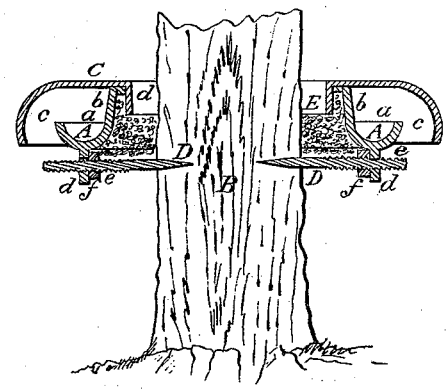
Witnesses:
Samuel N Piper
G. H. Washburn
Inventor:
Timothy Tufts
by his attorney
R. H. Eddy

UNITED STATES PATENT OFFICE.

TIMOTHY TUFTS, OF SOMERVILLE, ASSIGNOR TO PARSON DAVIS, OF SOMERVILLE, AND J. ALBERT TAYLOR, OF BOSTON, MASSACHUSETTS.

IMPROVEMENT IN TREE-PROTECTORS.

Specification forming part of Letters Patent No. 54,232, dated April 24, 1866.

*To all whom it may concern:*

Be it known that I, TIMOTHY TUFTS, of Somerville, in the county of Middlesex and State of Massachusetts, have invented a new and useful or Improved Tree-Protector; and I do hereby declare the same to be fully described in the following specification and represented in the accompanying drawings, of which—

Figure 1 is a top view, Fig. 2 a front elevation, and Fig. 3 a vertical section, of it. Fig. 4 is a top view of the annular trough and its cap-supporter.

In the said drawings, A denotes an annular trough, which should be constructed in two parts, $a\ a$, in order that it may be readily applied to and made to encircle the trunk B of a tree and an annular space between such trough and trunk. These parts are to be fastened and connected together at their abutting ends, so as to form a continuous and tight trough to go around the tree and contain a liquid. The said trough I usually make of cast-iron, and with its inner part or edge raised above the outer part or edge in manner as shown at $b\ b$, the same being to constitute a neck or support for an annular cap or cover, C, which, like the trough, may be of cast-iron, and formed in two semicircular parts, $c\ c$, and with a tubular extension, $d$, to project therefrom in manner as represented in Fig. 3, such tubular extension being to fit into the neck $b$ of the trough, in order not only to centralize or properly adjust the cover relatively to the trough and the trunk, but to constitute a guard to prevent dust or matters which may be washed by rain from the trunk from passing into the trough.

From the bottom of the trough a series of lugs, $d\ d$, is projected downward at suitable distances apart.

A nail, D, having a screw, $e$, cut on it, and also having a nut, $f$, screwed on such screw, is passed through each of the said lugs, and driven transversely into the trunk B. While the said nails and lugs serve to support the trough, the nuts and screws answer to adjust and fix it in its due position with respect to the trunk; and, furthermore, the nails D D serve to support a packing, E, of oakum, which is to be placed around the trunk of the tree and between it and the trough A.

The cap or cover C does not touch the outer edge of the trough, but is arranged so that there may be a space between the two. The cover should extend beyond and project below the said outer edge of the trough, in manner as represented in Fig. 3. The cover, when so made and applied to the trough, can at any time be readily lifted up in order to enable a person to either examine the liquid contents of the latter or add thereto a fresh supply of liquid.

In practice the above-described improved tree-protector, applied to a tree in manner as specified, has been found to be a thorough preventive against the ascent of grubs up the tree, more especially when there is employed in it a liquid composition which I have invented for use in its trough, and which, on contact with a grub, is destructive to its life, it being also a liquid not liable to readily evaporate in warm weather or be congealed by extreme cold.

I lay no claim to an annular trough and a cover or tent thereto as a protector to a tree against the ascent of destructive grubs or insects.

I do not claim the invention as set forth in the Patent No. 44,238; but

What I do claim as my invention is as follows:

The combination and arrangement of the series of supporting-nails D and their screws $e$ and nuts $f$ with the annular trough and its projection $d$, or the equivalent thereof, or with the same and the annular packing E, arranged about the trunk of a tree, substantially as specified.

TIMOTHY TUFTS.

Witnesses:
R. H. EDDY,
F. P. HALE, Jr.